(12) United States Patent
Horio

(10) Patent No.: US 6,530,839 B2
(45) Date of Patent: Mar. 11, 2003

(54) GAME DEVICE, METHOD OF CONTROLLING GAME MACHINE, INFORMATION STORAGE MEDIUM, AND PROGRAM DISTRIBUTION DEVICE AND METHOD

(75) Inventor: Kenichiro Horio, Tokyo (JP)

(73) Assignees: Konami Corporation, Tokyo (JP); KCE Tokyo, Inc., Tokyo (JP)

(*) Notice: Subject to any disclaimer, the term of this patent is extended or adjusted under 35 U.S.C. 154(b) by 0 days.

(21) Appl. No.: 09/887,126

(22) Filed: Jun. 25, 2001

(65) Prior Publication Data

US 2002/0006823 A1 Jan. 17, 2002

(30) Foreign Application Priority Data

Jul. 17, 2000 (JP) .......................... 2000-215560

(51) Int. Cl.[7] .............................................. A63F 13/00
(52) U.S. Cl. .......................................... 463/36; 463/37
(58) Field of Search ............................... 463/36, 37, 38, 463/46, 47; 200/61.01

(56) References Cited

U.S. PATENT DOCUMENTS

| | | | | |
|---|---|---|---|---|
| 5,689,285 A | * | 11/1997 | Asher | 345/161 |
| 5,807,175 A | * | 9/1998 | Davis et al. | 463/36 |
| 5,876,286 A | * | 3/1999 | Lee | 463/31 |
| 6,004,210 A | * | 12/1999 | Shinohara | 463/36 |
| 6,007,428 A | * | 12/1999 | Nishiumi et al. | 463/36 |
| 6,102,802 A | * | 8/2000 | Armstrong | 463/37 |
| 6,128,006 A | * | 10/2000 | Rosenberg et al. | 345/163 |
| 6,186,896 B1 | * | 2/2001 | Takeda et al. | 463/38 |
| 6,208,271 B1 | * | 3/2001 | Armstrong | 341/34 |
| 6,213,880 B1 | * | 4/2001 | Sim | 463/37 |
| 6,217,444 B1 | * | 4/2001 | Kataoka et al. | 463/3 |
| 6,264,558 B1 | * | 7/2001 | Nishiumi et al. | 463/36 |
| 6,313,731 B1 | * | 11/2001 | Vance | 338/185 |
| 6,343,991 B1 | * | 2/2002 | Armstrong | 463/37 |
| 6,347,997 B1 | * | 2/2002 | Armstrong | 463/37 |
| 6,375,572 B1 | * | 4/2002 | Masuyama et al. | 463/43 |
| 6,388,655 B1 | * | 5/2002 | Leung | 345/157 |
| 6,390,919 B1 | * | 5/2002 | Kobayashi et al. | 463/36 |
| 6,400,303 B2 | * | 6/2002 | Armstrong | 341/176 |
| 2001/0008849 A1 | * | 7/2001 | Komata | 463/37 |
| 2001/0008851 A1 | * | 7/2001 | Komata | 463/37 |
| 2002/0065134 A1 | * | 5/2002 | Ogata et al. | 463/37 |

FOREIGN PATENT DOCUMENTS

JP          2-024555        5/1990

* cited by examiner

Primary Examiner—Henry C. Yuen
Assistant Examiner—Frederick C. Nicolas
(74) Attorney, Agent, or Firm—Sughrue Mion, PLLC

(57) ABSTRACT

A game in which a player is prevented from applying an excessive force to a button on a pressure sensitive controller. For a game device comprising a controller 32 for supplying one of digital values in a predetermined range in accordance with the force pressing of a button, the predetermined range includes a response range in which at least some of the digital values smaller than a predetermined threshold fall, and a response limit range in which the digital value at the predetermined threshold or greater falls. When a digital value supplied from the controller 32 falls in the response range, a response image changing in accordance with a change in the digital value is displayed. On the other hand, when the value falls in the response limit range, a response limit image whose change in accordance with the digital value is limited is displayed.

11 Claims, 6 Drawing Sheets

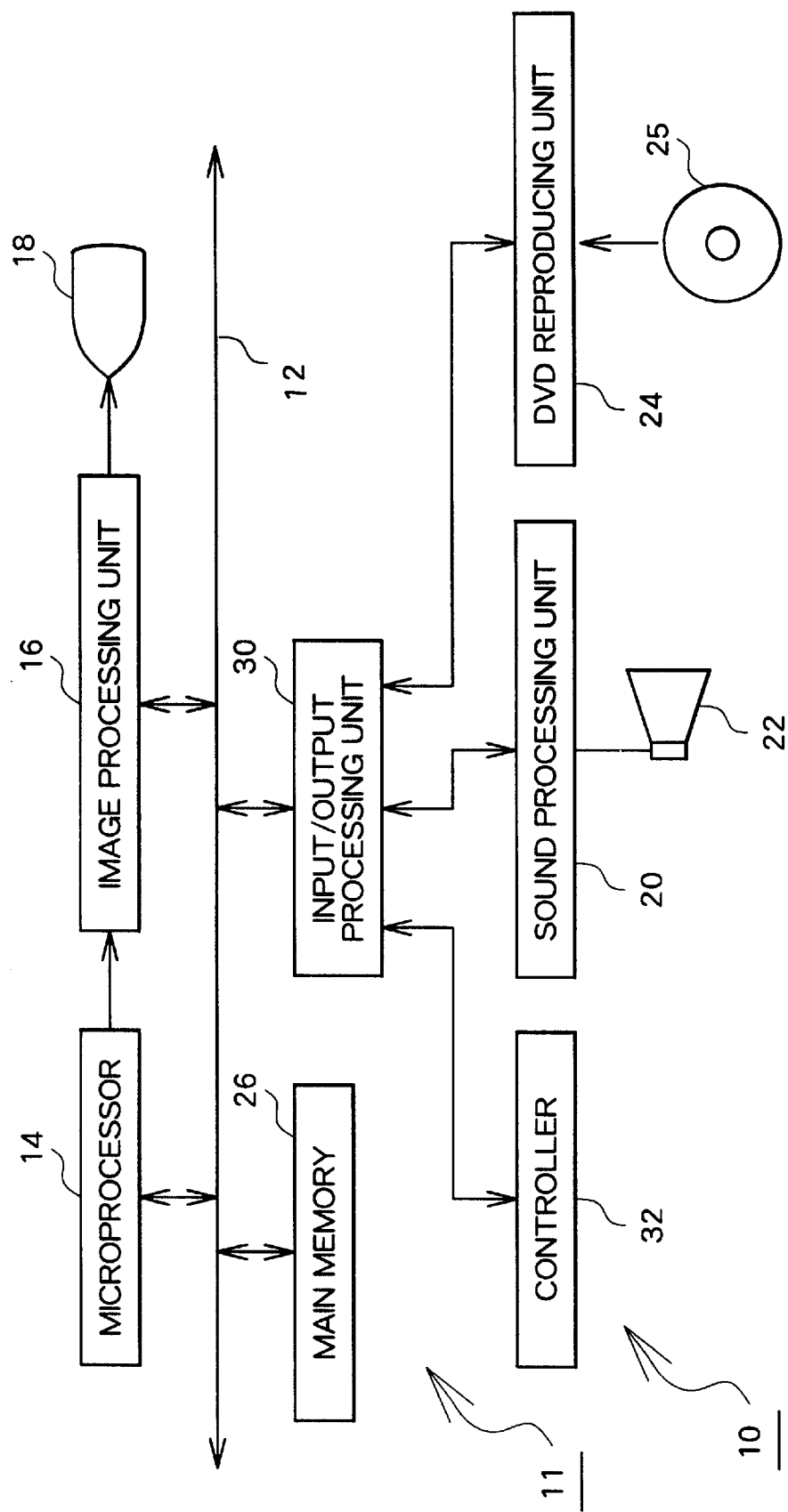

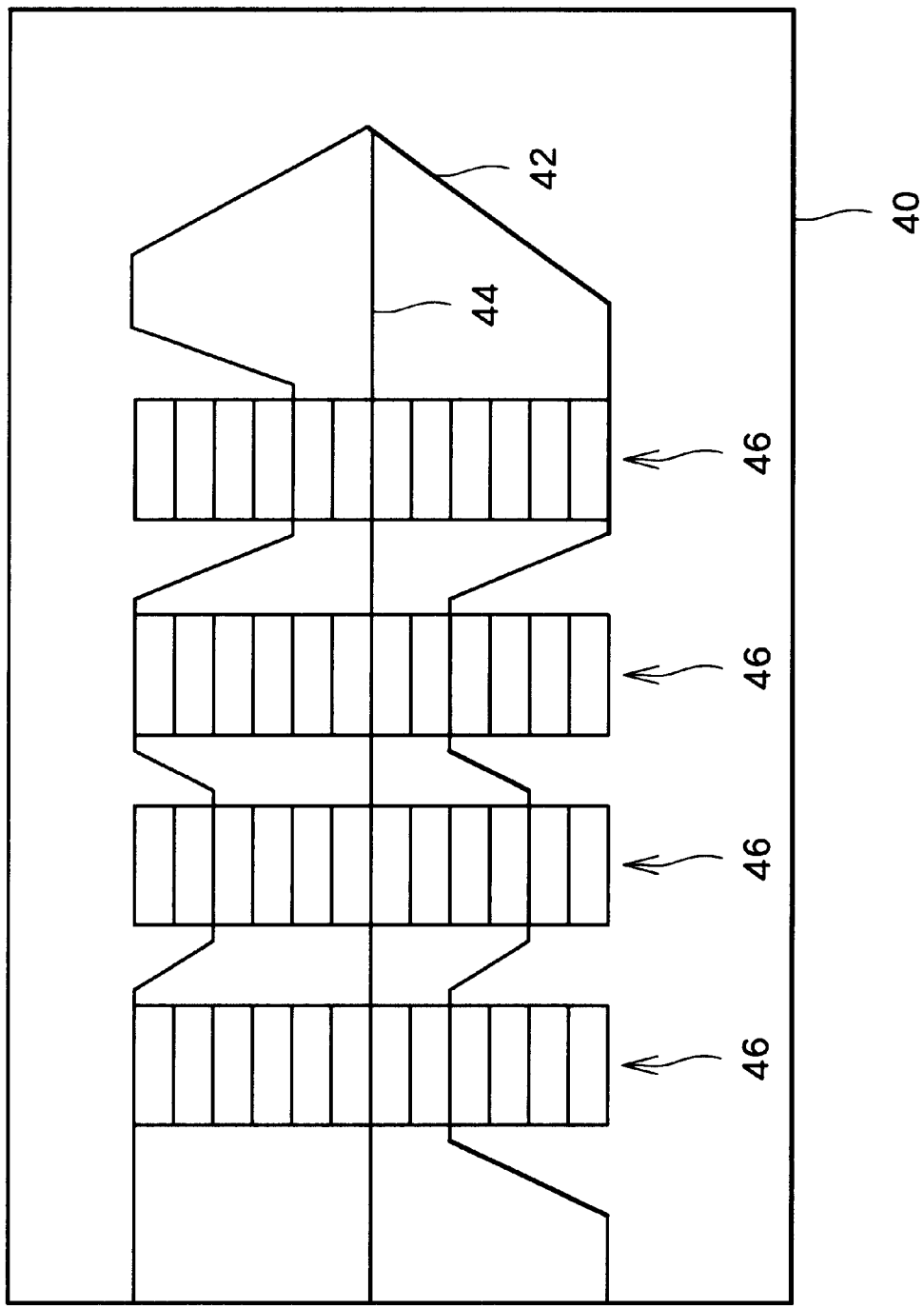

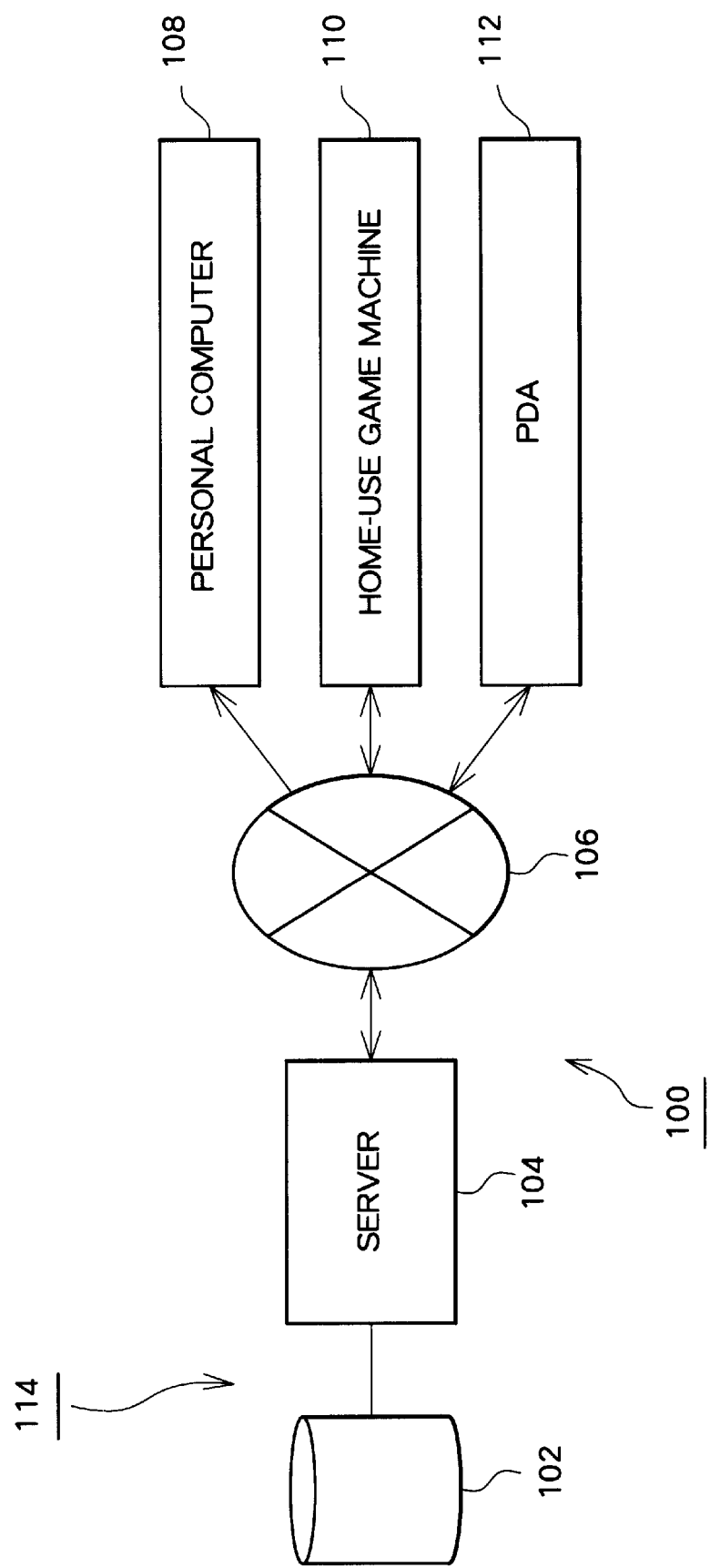

GAME DEVICE, METHOD OF CONTROLLING GAME MACHINE, INFORMATION STORAGE MEDIUM, AND PROGRAM DISTRIBUTION DEVICE AND METHOD

BACKGROUND OF THE INVENTION

1. Field of the Invention

The present invention relates to a game device, a method of controlling a game machine, an information storage medium, and a program distribution device and method. The present invention more particularly relates to a technique for protecting a controller (pressure sensitive controller) for providing a digital value in a predetermined range in accordance with the force pressing a button.

2. Description of the Prior Art

While generally only digital signals indicating whether a button is pressed or not can be provided from a controller in conventional game machines, the game machines becoming more widespread these days are provided with a pressure sensitive controller capable of providing digital signals indicating not only whether or not a button is pressed, but also how strongly the button is pressed.

On the game machines provided with such a pressure sensitive controller, a player may get so enthusiastic about the game that he/she may press the button too strongly. When the button is continually pressed with an excessive force, the pressure sensitive controller may break.

SUMMARY OF THE INVENTION

The present invention has been conceived in view of the above-described problems, and an object thereof is to provide a game device, a method of controlling a game machine, an information storage medium, and a program distribution device and method, capable of preventing a player from applying an excessive force to a button on a pressure sensitive controller.

In order to solve the above-described problems, a game device according to one aspect of the present invention comprises a controller for supplying one of digital values in a predetermined range in accordance with a force pressing a button, wherein the predetermined range includes a response range in which at least some of the digital values smaller than a predetermined threshold fall, and a response limit range in which the digital value at the predetermined threshold or greater falls, and the device further comprises output control means for providing a response output whose content is changed in accordance with a change in the digital value supplied from the controller when the digital value falls in the response range, and providing a response limit output having content change, in accordance with the digital value, that is limited when the digital value falls in the response limit range.

A method of controlling a game machine according to the present invention is a method of controlling a game machine comprising a controller for supplying one of digital values in predetermined range in accordance with a force pressing a button, wherein a response output whose content is changed in accordance with a change in the digital value supplied from the controller is provided when the digital value falls in a response range, a response limit output having a content change in accordance with the digital value that is limited is provided when the digital value falls in the response limit range, at least some of the digital values smaller than a predetermined threshold fall in the response range, and the digital value at the predetermined threshold or greater falls in the response limit range.

An information storage medium according to the present invention is an information storage medium used for storing a program for allowing a computer connectable to a controller for supplying one of digital values in a predetermined range in accordance with a force pressing a button to function as a game device, wherein the information storage medium contains a program configured so that: a response output whose content is changed in accordance with a change in the digital value supplied from the controller is provided when the digital value falls in a response range, a response limit output whose content change in accordance with the digital value is limited is provided when the digital value falls in the response limit range, at least some of the digital values smaller than a predetermined threshold fall in the response range, and the digital value at the predetermined threshold or greater falls in the response limit range.

A program distribution device according to the present invention is a program distribution device for distributing a program for allowing a computer connectable to a controller for supplying one of digital values in a predetermined range in accordance with a force pressing a button to function as a game device, wherein the program is configured so that: a response output whose content is changed in accordance with a change in the digital value supplied from the controller is provided when the digital value falls in a response range, a response limit output whose content change in accordance with the digital value is limited is provided when the digital value falls in the response limit range, at least some of the digital values smaller than a predetermined threshold fall in the response range, and the digital value at the predetermined threshold or greater falls in the response limit range.

A program distribution method according to the present invention is a program distribution method for distributing a program for allowing a computer connectable to a controller for supplying one of digital values in a predetermined range in accordance with a force pressing a button to function as a game device, wherein the program is configured so that: a response output whose content is changed in accordance with a change in the digital value supplied from the controller is provided when the digital value falls in a response range, a response limit output whose content change in accordance with the digital value is limited is provided when the digital value falls in the response limit range, at least some of the digital values smaller than a predetermined threshold fall in the response range, and the digital value at the predetermined threshold or greater falls in the response limit range.

According to the present invention, a digital value in a predetermined range is supplied from a controller. The digital value corresponds to the force pressing a button on the controller. The predetermined range includes a response range and a response limit range. At least some of the digital values smaller than a predetermined threshold fall in the response range, while digital values at the predetermined threshold or greater fall in the response limit range. The predetermined threshold may be determined based on, for example, the allowable maximum pressing force applied by a user to the controller in light of protection of the controller and on the corresponding digital value. According to the present invention, when a digital value falling within the response range is supplied from the controller, a response output whose content is changed in accordance with a change in the digital value is provided. More specifically, as long as the player presses a button on the controller so as to supply a digital value within the response range, an output whose content is in accordance with the pressing force is provided. On the other hand, when a digital value in a response limit range is supplied from the controller, a response limit output whose content change in accordance with the digital value is limited is provided. For example, the digital value supplied from the controller is not related to the displayed image. Thus, when the button on the controller is pressed to supply a digital value in the response limit range, the output content will not be in accordance with the force pressing the button, thereby preventing the player from applying an excessive force to the button. The output may be provided in the form of, for example, speech, image, vibration, and the like.

According to one embodiment of the present invention, the response limit output is an output whose content does not change in accordance with a change in the digital value, and is identical to the content of the response output corresponding to the maximum value of the response range. As a result, when the value exceeds the response range, the change in output content in accordance with the force pressing the button is stopped, and the output content corresponding to the maximum value of the response range is maintained, thereby preventing the player from applying an excessive force to the button.

A game device according to the present invention is a game device comprising a controller for supplying one of digital values in a predetermined range in accordance with a force pressing a button, wherein the predetermined range includes a response range in which at least some of the digital values smaller than a predetermined threshold fall, and a response limit range in which the digital value at the predetermined threshold or greater falls, and the device further comprises display control means for displaying a response image changed in accordance with a change in the digital value supplied from the controller when the digital value falls in the response range, and displaying a response limit image whose change in accordance with the digital value is limited when the digital value falls in the response limit range.

According to the present invention, a digital value within a predetermined range is supplied from a controller, and the digital value is in accordance with the force pressing a button on the controller. The predetermined range includes a response range and a response limit range. At least some of the digital values smaller than a predetermined threshold fall in the response range, while digital values at the predetermined threshold or greater fall in the response limit range. The predetermined threshold may be determined based on, for example, the allowable maximum pressing force applied by a player to the controller in light of protection of the controller and on the corresponding digital value. According to the present invention, when a digital value falling within the response range is supplied from the controller, a response image changing in accordance with a change in the digital value is displayed. More specifically, as long as the player presses the button on the controller so as to supply a digital value within the response range, an image in accordance with the pressing force is displayed. On the other hand, when a digital value in the response limit range is supplied from the controller, a response limit image whose change in accordance with the digital value is limited is displayed. For example, the digital value supplied from the controller will not be related to the displayed image. Thus, when the button on the controller is pressed to supply a digital value in the response limit range, the image will not be displayed in accordance with the force pressing the button, thereby preventing the player from applying an excessive force to the button.

According to another embodiment of the present invention, the response limit image is an image which does not change in accordance with a change in the digital value, and is identical to the response image corresponding to the maximum value of the response range. As a result, when the digital value exceeds the response range, the change in image in accordance with the force pressing the button is stopped, and the response image corresponding to the maximum value of the response range is maintained, thereby preventing the player from applying an excessive force to the button.

In such an application, the response range may be divided into a plurality of sub ranges, and the display control means may display, when the digital value supplied from the controller falls in any of the plurality of sub ranges, an image corresponding to the sub range, and may display an image corresponding to the sub range in which the maximum value of the response range falls when it falls in the response limit range. As a result, a player is presented with an image in accordance with the pressing force when the digital value within the response range is supplied, and with an image corresponding to the digital value at the upper limit of the response range when the digital value in the response limit range is supplied. In other words, the image gradually changes by increasing the pressing force applied to the button by the player, and, when an excessive force is applied to the button, an image corresponding to the digital value at the upper limit of the response range continues to be displayed. Consequently, the player is prevented from applying an excessive force. By setting the response limit range wider than any of the plurality of sub ranges, protection of the controller can further be ensured.

BRIEF DESCRIPTION OF THE DRAWINGS

FIG. 1 is a diagram showing an overall structure of a game device according to a preferred embodiment of the present invention.

FIG. 3 shows an example of a game screen image.

FIG. 6 is a diagram showing an overall structure of a game program distribution system according to another preferred embodiment of the present invention.

DESCRIPTION OF THE PREFERRED EMBODIMENTS

Figure 2A:
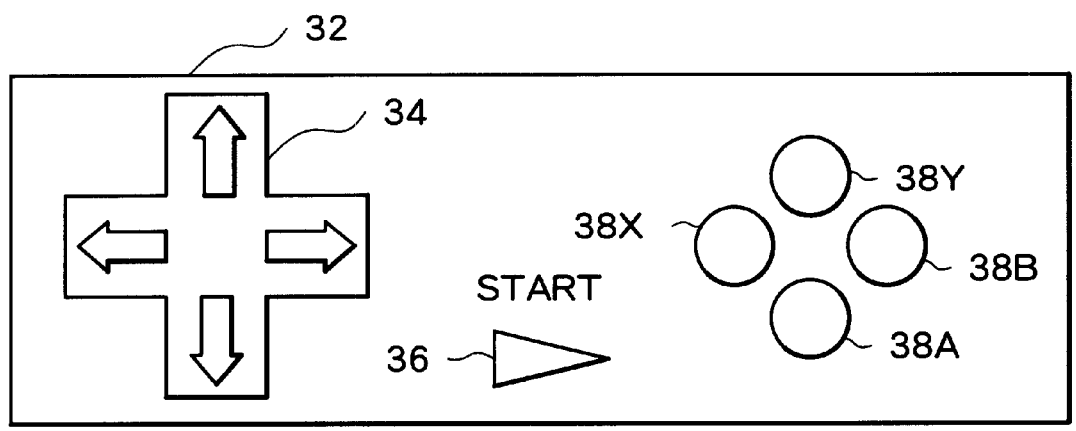
FIG. 2A and FIG. 2B are a plan view and a rear side view, respectively, illustrating an exemplary controller.

The entire disclosure of the corresponding Japanese application 2000-215560 filed on Jul. 17, 2000 including specification, claims, drawings and summary are incorporated herein by reference.

Preferred embodiments of the present invention will now be described with reference to the drawings.

FIG. 1 is a diagram showing a structure of a game device according to a preferred embodiment of the present invention. A device 10 comprises a DVD 25, or an information storage medium, mounted in a home-use game machine 11, which is in turn connected to a monitor 18 and a speaker 22. Note that although a DVD 25 is used here to supply a game program and game data to the home-use game machine 11, any other information storage media, such as a CD-ROM or a ROM card, may be used instead. Alternatively, a game program and game data may be remotely supplied to the home-use game machine 11 via a communication network, as will be described later.

The home-use game machine 11 comprises a microprocessor 14, an image processing unit 16, a main memory 26, and an input/output processing unit 30, mutually connected via a bus for data exchange, with the input/output processing unit 30 being further connected to a controller 32, a sound processing unit 20, and a DVD reproducing unit 24. The respective elements of the home-use game machine 11 other than the controller 32 are all accommodated in a predetermined single housing. By way of example, the monitor 18 may be a home TV receiver, and the speaker 22 may be a speaker incorporated into the home TV receiver.

The microprocessor 14 controls the respective elements of the home-use game machine 11 based on an operating system stored in an unillustrated ROM and a game program read from the DVD 25. The bus 12 is used for exchanging addresses and data among the respective elements of the home-use game machine 11. The main memory 26 is used for storing a game program and game data read from the DVD 25 as required. The image processing unit 16, which includes a VRAM, receives image data from the microprocessor 14, and draws a game screen image in the VRAM based on the received input data. The image processing unit 16, moreover, converts the content of the VRAM into a video signal to the monitor 18 at predetermined timing.

The input/output processing unit 30 is an interface for relaying data communication between the microprocessor 14 and the controller 32, the sound processing unit 20, or the DVD reproducing unit 24. The controller 32 is an input means via which a player operates a game. The input/output processing unit 30 periodically (for example, every ⅟60 of a second) scans the operation states of the various buttons of the controller 32, and supplies a signal indicative of the scanning result to the microprocessor via the bus 12. Based on the signal, the microprocessor 14 judges the player's game operation. The sound processing unit 20, which comprises a sound buffer, reproduces data for music, a game effect sound, and so on, which are read from the DVD 25 and stored in the sound buffer, and outputs sound with the speaker 22. The DVD reproducing unit 24 reads a game program and game data recorded in the DVD 25 in accordance with an instruction from the microprocessor 14.

Figure 2B:
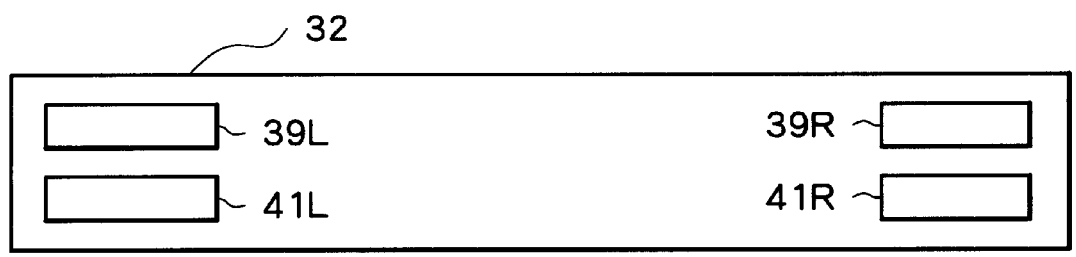

FIG. 2 is a diagram showing an example of the controller 32. The shown controller 32, commonly used for a variety of games, has buttons on the surface thereof, including a direction button 34, a start button 36, and buttons 38X, 38Y, 38A, and 38B, as shown in FIG. 2(*a*). The controller 32 further includes buttons 39R, 39L, 41R and 41L on the rear side surface. More specifically, on the rear side surface of the controller 32, the buttons 41R and 41L are provided on the right and left sides located closer to a top surface, and the buttons 39R and 39L are provided on the right and left sides located closer to a bottom surface, respectively. The direction button 34 provided on the top surface is a cross-shaped button generally used in designating a direction in which a character or a cursor moves. The start button 36 is a small, triangular press button generally used to either start or forcibly end a game. The buttons 38X, 38Y, 38A, 38B, 39L, 39R, 41L, and 41R are generally used for other game operations. In the above-described controller 32, especially the direction button 34, and the buttons 38X, 38Y, 38A, 38B, 39L, 39R, 41L, and 41R are configured as pressure sensitive buttons provided with a pressure sensor. When a player presses any of these buttons, a digital value from 0 to 255 is supplied to the home-use game machine 11 in 256 levels in accordance with the force pressing the button. More specifically, the force pressing the button can be determined in the home-use game machine 11, such as the digital value 0 supplied from the controller 32 indicating that the button is not pressed, and the digital value 255 indicating that the button is pressed with the maximum force.

FIG. 3 shows an example of a game screen image displayed on the monitor 18 of the game device 10. A player can enjoy an unlocking game with the game device 10, and a key-shaped figure 42 is displayed at the center of the game screen 40. At a characteristic portion of the key-shaped figure 42, a gauge 46 is displayed superposed thereon. When two predetermined buttons (buttons 41R and 39R) of the controller 32 are pressed, one of the gauges 46 expands or shrinks in the ascending or descending directions from a central line 44 in accordance with the force pressing the buttons. When the player presses another button of the controller 32 (the button 38B) with the upper and lower ends of the gauge 46 reaching the edge of the key-shaped figure 42, the gauge matching operation for that particular gauge 46 is cleared, and the player proceeds to try another gauge matching operation for the next gauge 46. In order to clarify the gauge 46 subjected to operation, that particular gauge 46 currently operated is displayed superposed on the key-shape figure 42 at an α value (the semitransparent value) of about 90%, while the remaining gauges 46 are superposed on the figure 42 at the α value of about 30%. Thus, the player starts operation with a gauge near a tip of the key, and, when he/she succeeds in matching all the gauges 46 with the key-shaped figure 42, the unlocking game is completed (game clear). On the other hand, if anyone of the gauges 46 exhibits a mismatch with the key-shaped figure 42 when the player presses the button 38B, the player must restart the gauge matching operation from the first gauge 46. The unlocking game can be paused as desired by pressing the button 38A.

Figure 4:
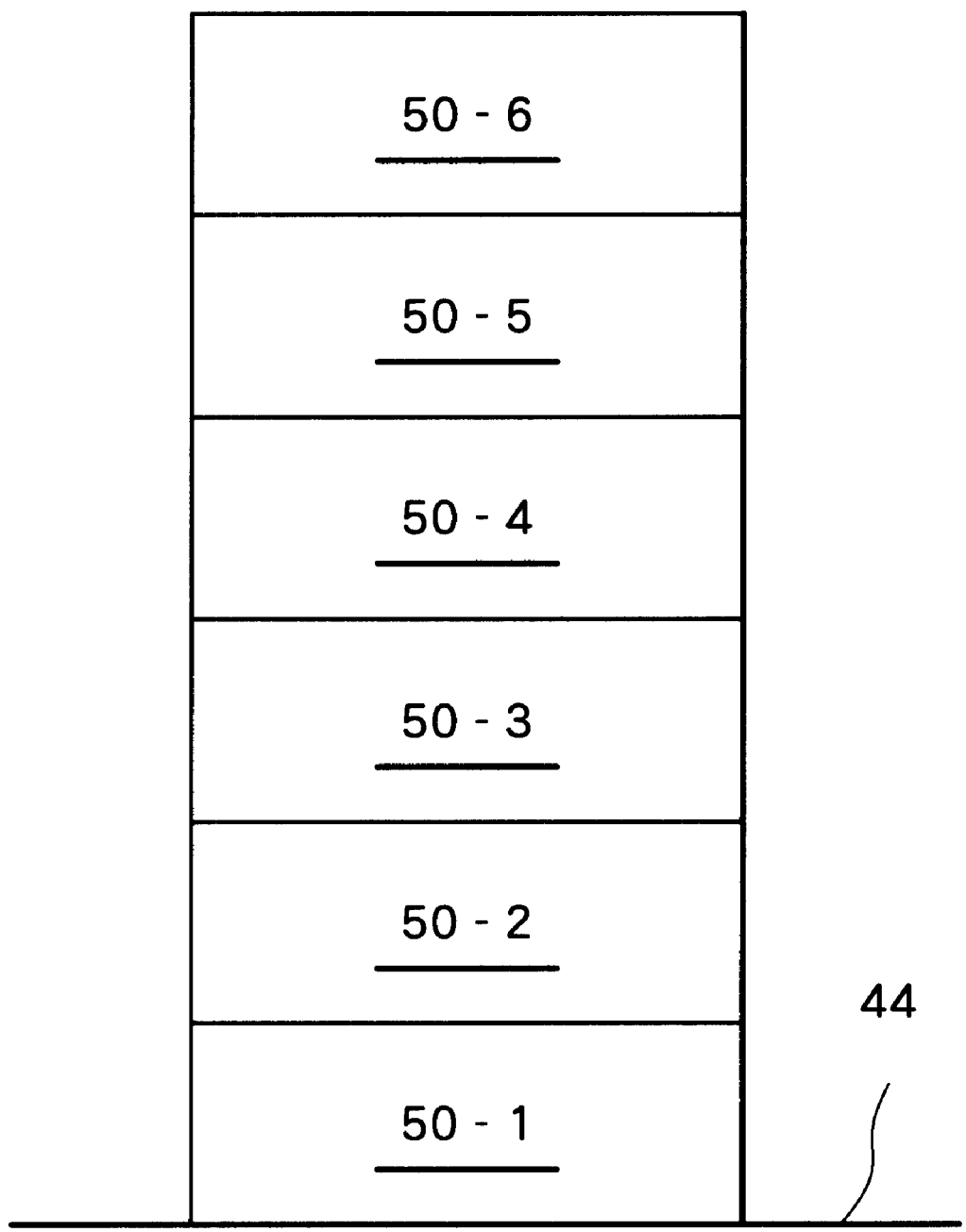
FIG. 4 is an enlarged view showing part of the game screen image.

FIG. 4 is an enlarged view showing a portion of the gauge 46 located over the central line 44. As shown in this figure, the gauge 46 is composed of the portions located over and under the central line 44, each including six block images. The portion located over the central line 44 is composed of six block images 50-1 to 50-6. When the button 41R is pressed, all or some of these block images 50-1 to 50-6 are displayed in a distinctive manner in accordance with the digital value (0–255) supplied from the controller 32 corresponding to the pressing force. While the procedure for displaying the upper half of the gauge 46 will be described below, the same procedure can be applied to the lower half thereof.

When the digital value provided from the controller 32 in response to depression of the button 41R is 0–10, all the block images 50-1 to 50-6 are displayed in semitransparent white. When the value is in the range of 11–40, the block images 50-2 to 50-6 are displayed in semitransparent white and the block image 50-1 in semitransparent orange. When the value is in the range of 41–70, the block images 50-3 to 50-6 are displayed in semitransparent white and the block images 50-1 and 50-2 in semitransparent orange. When the value is in the range of 71–100, the block images 50-4 to 50-6 are displayed in semitransparent white and the block images 50-1 to 50-3 in semitransparent orange. When the value is in the range of 101–130, the block images 50-5 and 50-6 are displayed in semitransparent white and the block images 50-1 to 50-4 in semitransparent orange. When the value is in the range of 131–160, the block image 50-6 is displayed in semitransparent white and the block images 50-1 to 50-5 in semitransparent orange. When the value is in the range of 131–255, all the block images 50-1 to 50-6 are displayed in semitransparent orange.

Thus, 30 digital values are assigned to each of the block images 50-1 to 50-5, and as many as 125 digital values are assigned specially to the block image 50-6. More specifically, 95 more digital values, namely, 161–255, are assigned to the block image 50-6 than the remaining block images 50-1 to 50-5. That is, the digital value range of 11–160 is a response range in which the block images 50-1 to 50-6 are displayed in an expanding or shrinking manner in accordance with the force pressing the button 41R (response image), while the digital value range of 161–255 can be regarded as a response limit (non-response) range in which all the block images 50-1 to 50-6 are displayed in semitransparent orange (response limit image) as in the range of 131–160, and the displayed state of the block images 50-1 to 50-6 remains unchanged even if the digital value shows a change by 30 or greater. These ranges are divided by the threshold value 161.

Thus, the digital values (0–255) are divided into the response range and the response limit range, and, when a digital value in the response range is supplied from the controller 32, the block images 50-1 to 50-6 expands or shrinks in accordance with a change in the digital value. On the other hand, a digital value in the response limit range to which digital values no smaller than the predetermined threshold (161) belong is supplied, the displayed state of the block images 50-1 to 50-6 will not change in response to the digital value. As a result, the displayed image on the monitor 18 does not change by pressing the button 41R of the controller 32 any harder, so that the player will not press the button 41R too strongly. Further, as the image displayed for the response limit range (response limit image) is the same as the image (all the block images 50-1 to 50-6 being displayed in semitransparent orange) presented when the digital value falls in the range of 131–160 (the sub range in which the maximum value of the response range falls), the player can be instantly informed, when he/she presses the button 41R too strongly, that the button is pressed with the maximum force and no change is made by pressing the button any harder, thereby preventing the player from pressing the button 41R with a stronger force.

Figure 5:
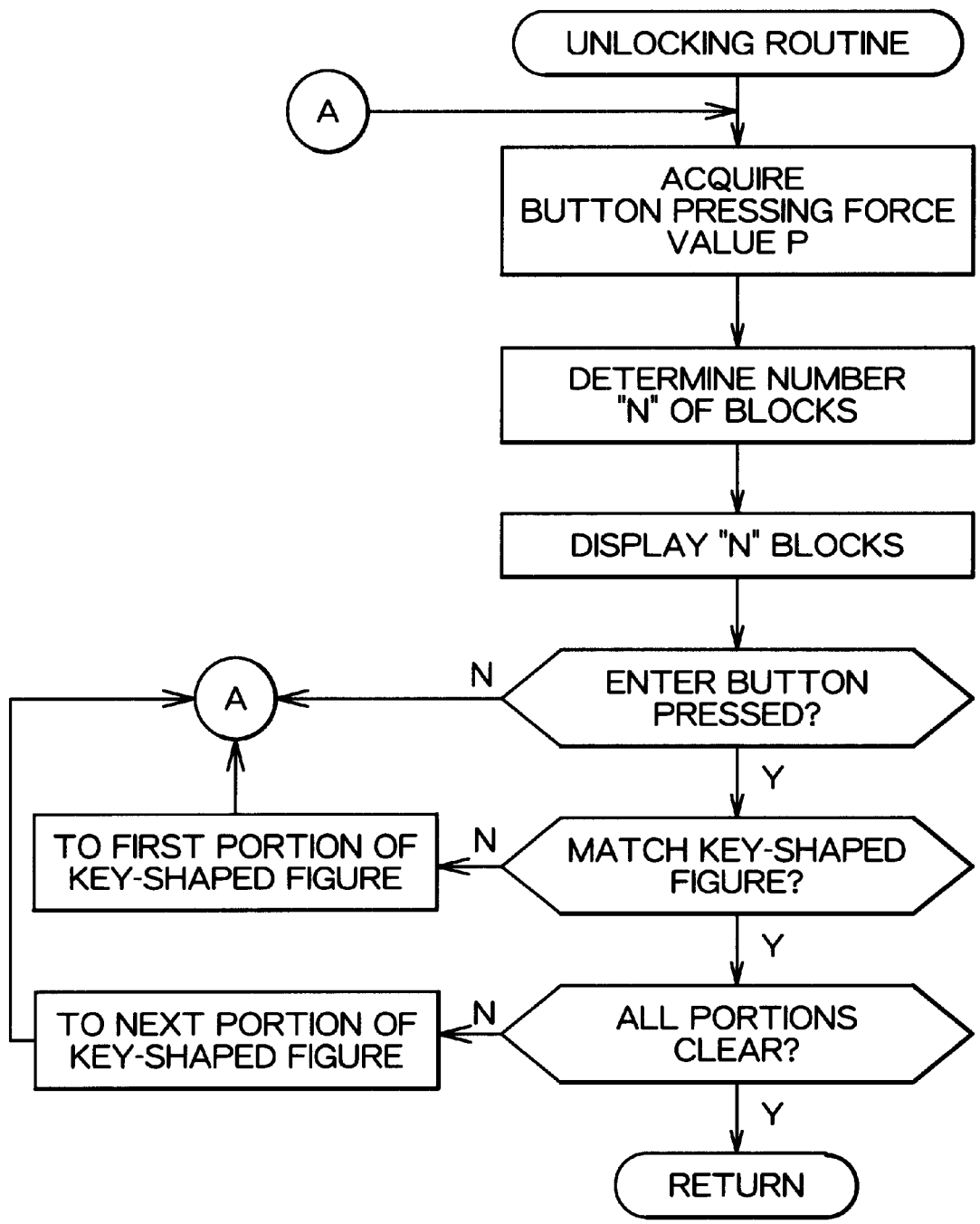
FIG. 5 is a flowchart for describing a process of implementing an unlocking game.

FIG. 5 is a flowchart for describing a process of implementing the unlocking game. The process illustrated therein is performed according to the game program stored in the DVD 25. Referring to FIG. 5, in the unlocking game, only the gauge 46 located near the tip of the key is first displayed at the α value of about 90% with a background image, such as the key-shaped figure 42, being displayed. The remaining gauges 46 are displayed at the α value of about 30%. The microprocessor 14 acquires a digital value (pressing force value) P supplied from the controller 32 as a result of depression of the buttons 41R and 39L (S101). Next, the number N of block images to be displayed is determined by comparing the digital value P with the above-described criteria (S102), and N block images are displayed (S103). For example, for the upper half of the gauge 46, the block images 50-1 to 50-N are displayed in semitransparent orange and the block images 50-(N+1) to 50-6 in semitransparent white. When N is 0, all the block images 50-1 to 50-6 are displayed in semitransparent white. Similarly for the lower half, N block images are displayed in semitransparent orange in a descending manner from the central line 44, and the remaining block images are displayed in semitransparent white. The process from S101 to S103 is repeated until the enter button (button 38B) is pressed (S104). If the player is pressing the buttons 41R and 39L when game operation is started for each gauge, preferably the gauge 46 of interest gradually expands to increase the number of block images displayed in semitransparent orange from 0 to N.

When the enter button is pressed, the microprocessor 14 determines whether or not the upper and lower limits of the gauge 46 match with those of the key-shaped figure 42 (S105). If either one of the upper and lower limits does not match, the player must return to the gauge 46 located closer to the tip and retry the shape matching operation (S107). If both limits match the corresponding ones, determination is made as to whether or not the shape matching operation has been completed for all the gauges 46 (S106). If completed, a predetermined clear process is performed and the process returns to a main game process. On the other hand, if there is still a gauge 46 for which the shape matching operation has not yet been completed, the process causes the next gauge 46 to be operated for the shape match (S108). More specifically, the α value of the gauge 46 just cleared is decreased from about 90% to about 30%, and the α value of the gauge 46 located adjacent thereto on the left side is increased from about 30% to about 90%. The process from the step S101 to the step S104 is performed for the new gauge 46. The unlocking game is thus implemented. As a non-sensitive range is provided for the buttons 41R and 39R to prevent the gauge 46 from expanding or shrinking when these buttons are pressed with an excessive force to output a digital value greater than the threshold as described above, ineffectual force which does not cause expansion or shrinkage of the gauge 46 can be prevented from being applied to the buttons 41R and 39R. As a result, the life of the controller 32 can be prolonged.

It should be noted that the present invention is not limited to the above-described embodiment.

For example, while an image in which the gauge 46 is expanded to the limit is used as a response limit image in the above description, alternatively or additionally an alert image can be displayed in a separate region. Alternatively, all or part of the gauge 46 can be displayed in another color (e.g. semitransparent red) when a digital value in the response limit range is output from the controller 32.

While the present invention is applied to the unlocking game in the above description, it is applicable to any kind of game in which information indicative of the force pressing the button is supplied from a controller, such as a driving game in which a gauge or a meter (analogue or digital meter) is displayed in accordance with the angle at which the accelerator or the brake pedal is depressed. In such an application, when a digital value in a response limit range is supplied from the controller, the gauge representing the accelerator or brake pedal depressing angle can be displayed in the fully expanded state to be irresponsive to the input. Alternatively, the gauge may be displayed in a different color, and a message, such as "Accelerator fully depressed!" and "Full braking!", may be displayed. Thus, the player is instantly informed that no change can be made to the game by pressing the button any harder, thereby protecting the controller.

While the present invention is described as being applied to the home-use game machine 11 as an example, it is similarly applicable to an arcade (commercial-use) game machine. In such an application, the machine preferably employs a high-speed storage device instead of the DVD 25 and the DVD reproducing unit 24, and incorporates the monitor 18 and the speaker 22.

Further, while the DVD 25 containing the game program and the game data is employed in the home-use game machine 11 in the above description, any computers, such as a personal computer, capable of reading the game program and the game data recorded in an information storage medium and performing information processing based on the read out content can be employed.

Still further, whereas a game program and game data are provided from a DVD 25, or an information storage medium, to a home-use game machine 11 in the above, a game program and game data may be distributed through a communication network to each home. FIG. 6 is a diagram showing an overall structure of a game program distribution system utilizing a communication network. As shown, a game program distribution system 100 comprises a game database 102, a server 104, a communication network 106, a personal computer 108, a home-use game machine 110, and a PDA (Personal Digital Assistant) 112, wherein the game database 102 and the server 104 together constitute a game program distribution device 114. The communication network 106 may be, for example, the Internet or a cable television network. In this system, the game database 102 stores a game program and game data, similar to those stored in the DVD 25. When a user makes a request for a game distribution, using the personal computer 108, the home-use game machine 110, the PDA 112, or the like, the request is forwarded to the server 104 via the communication network 106. In response to the request, the server 104 reads the game program and game data from the game database 102 and transfers them to the requesting entity, such as a personal computer 108, a home-use game machine 110, a PDA 112, or the like. Note that although a game distribution is effected in response to a game distribution request in the above, the server 104 may transmit them one-sidedly. Also, game program and game data necessary for playing a game may not necessarily be all distributed at the same time, and only those necessary for each aspect of the game may be distributed at an appropriate timing. With game distribution via a communication network 106 as described above, a demander can easily obtain a game program and game data necessary for taking good care of the controller 23.

As described above, according to the present invention, an output in accordance with a digital value is provided when the digital value in a response range is supplied from a controller, while an output in accordance with a digital value is limited when the digital value in a response limit range is supplied. As a result, when a digital value in the response limit range is supplied by pressing a button on the controller, an output in accordance therewith is limited, thereby preventing a player from applying an excessive force to the button.

What is claimed is:

1. A game device comprising:
   a controller for supplying one of digital values in a predetermined range in accordance with a force pressing of a button, wherein said predetermined range includes a response range in which at least some of the digital values smaller than a predetermined threshold fall, and a response limit range in which at least some of the digital values at said predetermined threshold or greater falls, and
   output control means for providing a response output whose content is changed in accordance with a change in the digital value supplied from said controller when said digital value falls in said response range, and providing a response limit output whose content change in accordance with the digital value is limited when said digital value falls in said response limit range.

2. The game device according to claim 1, wherein said response limit output is an output whose content does not change in accordance with a change in said digital value, and is identical to the content of said response output corresponding to a maximum value of said response range.

3. A game device comprising:
   a controller for supplying one of digital values in a predetermined range in accordance with a force pressing of a button, wherein said predetermined range includes a response range in which at least some of the digital values smaller than a predetermined threshold fall, and a response limit range in which at least some of the digital values at said predetermined threshold or greater falls, and
   display and control means for displaying a response image changed in accordance with a change in the digital value supplied from said controller when said digital value falls in said response range, and displaying a response limit image whose change in accordance with the digital value is limited when said digital value falls in said response limit range.

4. The game device according to claim 3, wherein said response limit image is an image which does not change in accordance with a change in said digital value, and is identical to said response image corresponding to a maximum value of said response range.

5. The game device according to claim 3, wherein said response range is divided into a plurality of sub ranges, and
   said display and control means displays, when the digital value supplied from said controller falls in one of the plurality of sub ranges, an image corresponding to a sub range, and displays the image corresponding to the sub range in which a maximum value of said response range falls when the digital value falls in said response limit range.

6. The game device according to claim 5, wherein said response limit range is set wider than any one of said plurality of sub ranges.

7. A method of controlling a game machine with a controller comprising:
   supplying one of digital values in a predetermined range in accordance with a force pressing of a button on said controller;
   providing a response output whose content is changed in accordance with a change in a digital value supplied from said controller when said digital value falls in a response range; and
   providing a response limit output whose content changes in accordance with the digital value is limited when said digital value falls in said response limit range,
   wherein at least some of the digital values smaller than a predetermined threshold fall in said response range, and any digital value at said predetermined threshold or greater falls in said response limit range.

8. An information storage medium used for storing a program for allowing a computer connectable to a controller for supplying one of digital values in a predetermined range in accordance with a force pressing of a button to function as a game device, wherein said information storage medium contains a program configured for:
   providing a response output whose content is changed in accordance with a change in a digital value supplied from said controller when said digital value falls in a response range, and
   providing a response limit output whose content change in accordance with the digital value is limited, when said digital value falls in said response limit range, wherein, at least some of the digital values smaller than a predetermined threshold fall in said response range, and any digital value at said predetermined threshold or greater falls in said response limit range.

9. A program distribution device for distributing a program for allowing a computer connectable to a controller for supplying one of digital values in a predetermined range in accordance with a force pressing of a button to function as a game device, wherein said program is configured for:

providing a response output whose content is changed in accordance with a change in a digital value supplied from said controller, when said digital value falls in a response range, and providing a response limit output whose content change in accordance with the digital value is limited when said digital value falls in said response limit range, wherein, at least some of the digital values smaller than a predetermined threshold fall in said response range, and any digital value at said predetermined threshold or greater falls in said response limit range.

10. A program distribution method for distributing a program for allowing a computer connectable to a controller for supplying one of digital values in a predetermined range in accordance with a force pressing of a button to function as a game device, wherein said program is configured for:

providing a response output whose content is changed in accordance with a change in the digital value supplied from said controller when said digital value falls in a response range, and providing a response limit output whose content change in accordance with the digital value is limited when said digital value falls in said response limit range, wherein, at least some of the digital values smaller than a predetermined threshold fall in said response range, and any digital value at said predetermined threshold or greater falls in said response limit range.

11. A program for allowing a computer connectable to a controller for supplying one of digital values in a predetermined range in accordance with a force pressing of a button to function as a game device, wherein said program is configured for:

providing a response output whose content is changed in accordance with a change in the digital value supplied from said controller when said digital value falls in a response range, and providing a response limit output whose content change in accordance with the digital value is limited when said digital value falls in said response limit range, wherein, at least some of the digital values smaller than a predetermined threshold fall in said response range, and any digital value at said predetermined threshold or greater falls in said response limit range.

* * * * *